United States Patent
Dix (10) Patent No.: US 10,820,477 B2
(45) Date of Patent: Nov. 3, 2020

(54) SYSTEM AND METHOD FOR AUTOMATIC IMPLEMENT DEPTH MEASUREMENT CONTROL

(71) Applicant: CNH Industrial America LLC, New Holland, PA (US)

(72) Inventor: Peter John Dix, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 154 days.

(21) Appl. No.: 16/049,021

(22) Filed: Jul. 30, 2018

(65) Prior Publication Data

US 2020/0029487 A1    Jan. 30, 2020

(51) Int. Cl.
| | |
|---|---|
| A01B 63/111 | (2006.01) |
| A01B 69/00 | (2006.01) |
| A01B 79/00 | (2006.01) |
| A01B 63/00 | (2006.01) |
| A01B 69/04 | (2006.01) |
| G05D 1/02 | (2020.01) |

(52) U.S. Cl.
CPC .......... *A01B 79/005* (2013.01); *A01B 63/008* (2013.01); *A01B 69/008* (2013.01); *G05D 1/0212* (2013.01); *G05D 1/0278* (2013.01); *G05D 1/0223* (2013.01); *G05D 2201/0201* (2013.01)

(58) Field of Classification Search
CPC ..... A01B 63/008; A01B 69/008; A01B 69/00; A01B 69/007; A01B 79/005; G05D 1/0278; G05D 1/027; G05D 1/0212; G05D 1/0219; G05D 1/0223
USPC .......... 340/588; 342/357.22, 357.31; 701/41, 701/50, 425, 516, 519, 533
See application file for complete search history.

(56) References Cited

U.S. PATENT DOCUMENTS

| | | | |
|---|---|---|---|
| 5,236,924 A | 8/1993 | Katoh et al. | |
| 5,931,882 A | 8/1999 | Fick et al. | |
| 5,995,902 A | 11/1999 | Monson | |
| 6,345,231 B2 | 2/2002 | Quincke | |
| 7,000,710 B1 | 2/2006 | Umbach | |

(Continued)

FOREIGN PATENT DOCUMENTS

| | | |
|---|---|---|
| EP | 3289847 A1 | 3/2018 |
| JP | H09107717 A | 4/1997 |

OTHER PUBLICATIONS

International Search Report/Written Opinion; Application No. PCT/US2019/043380 dated Nov. 6, 2019.

*Primary Examiner* — Robert E Pezzuto
(74) *Attorney, Agent, or Firm* — Rickard K. DeMille; Rebecca L. Henkel (57) ABSTRACT

A control system for a work vehicle of a work vehicle system is provided that includes at least one controller including a memory and a processor. The at least one controller is configured to determine an attitude of a working surface of an implement relative to a field. In addition, the at least one controller is configured to generate evenly spaced swaths of the field, each swath having a center line. Further, the at least one controller is configured to determine target altitudes for points along the center line for a respective swath. Even further, the at least one controller is configured to adjust a depth of the working surface of the implement relative to the field to meet the target altitudes at respective points while the work vehicle moves along the field.

20 Claims, 7 Drawing Sheets

(56) References Cited

U.S. PATENT DOCUMENTS

| | | | |
|---|---|---|---|
| 7,216,033 B2* | 5/2007 | Flann | A01B 69/008 701/533 |
| 7,689,356 B2* | 3/2010 | Dix | A01B 69/008 701/425 |
| 7,706,948 B2 | 4/2010 | Dix et al. | |
| 7,715,979 B2* | 5/2010 | Dix | A01B 69/008 340/588 |
| 8,112,201 B2 | 2/2012 | Aral | |
| 8,296,052 B2* | 10/2012 | Dix | A01B 69/008 701/469 |
| 8,311,696 B2 | 11/2012 | Reeve | |
| 8,527,197 B2 | 9/2013 | Poncelet born Morey | |
| 8,532,885 B1 | 9/2013 | Whitehead | |
| 8,583,326 B2* | 11/2013 | Collins | A01B 69/007 342/357.22 |
| 8,781,685 B2 | 7/2014 | McClure | |
| 9,389,615 B2 | 7/2016 | Webber et al. | |
| 10,251,329 B2* | 4/2019 | Foster | A01B 69/008 |
| 10,378,896 B2* | 8/2019 | Birnie | A01B 69/008 |
| 2003/0083804 A1 | 5/2003 | Pilley et al. | |
| 2014/0277676 A1 | 9/2014 | Gattis et al. | |
| 2015/0331423 A1 | 11/2015 | Volger et al. | |
| 2018/0359906 A1 | 12/2018 | Foster et al. | |

* cited by examiner

SYSTEM AND METHOD FOR AUTOMATIC IMPLEMENT DEPTH MEASUREMENT CONTROL

BACKGROUND

The disclosure relates generally to an implement control system for a work vehicle.

Certain work vehicles (e.g., autonomous work vehicles, semi-autonomous vehicles, work vehicles with autoguidance systems, etc.) are configured to traverse portions of a field with and/or without operator input. For example, a work vehicle may be configured to move an implement along swaths through an agricultural field to enable the implement (e.g., box scraper, tile plow, etc.) to perform an agricultural operation (e.g., a pipe laying operation, a planting operation, a seeding operation, a harvesting operation, a tilling operation, a spraying operation, land leveling operation, ditch clearing operation, etc.) on the swaths. In certain applications, it may be desirable to have a field with a certain slope. However, the height of the ground may vary at various points making it hard to utilize the implement (e.g., via manual operation) to achieve the desired slope. Different techniques may be utilized to achieve the desired slope. For example, traditional survey techniques may be utilized (e.g., using markers for references). However, these survey techniques are tedious and expensive. Laser level systems (e.g., utilizing a laser to generate a plane for reference) may also be utilized. However, laser level techniques are difficult to set up and use and have issues with dust.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a control system for a work vehicle of a work vehicle system includes at least one controller including a memory and a processor. The at least one controller is configured to determine an attitude of a working surface of an implement relative to a field. In addition, the at least one controller is configured to generate evenly spaced swaths of the field, each swath having a center line. Further, the at least one controller is configured to determine target altitudes for points along the center line for a respective swath. Even further, the at least one controller is configured to adjust a depth of the working surface of the implement relative to the field to meet the target altitudes at respective points while the work vehicle moves along the field.

In another embodiment, one or more tangible, non-transitory, machine-readable media include instructions configured to cause a processor to determine an attitude of a working surface of an implement relative to a field. In addition, the instructions are configured to cause the processor to generate evenly spaced swaths of the field, each swath having a center line. Further, the instructions are configured to cause the processor to determine target altitudes for points along the center line for a respective swath. Even further, the instructions are configured to cause the controller to adjust a depth of the working surface of the implement relative to the field to meet the target altitudes at respective points while the work vehicle moves along the field.

In a further embodiment, a method for controlling an implement for a work vehicle of a work vehicle system includes determining, via at least one controller, an attitude of a working surface of an implement relative to a field. The method also includes generating, via the at least one controller, evenly spaced swaths of the field, each swath having a center line. The method further includes determining, via the at least one controller, target altitudes for points along the center line for a respective swath. The method even further includes adjusting, via the at least one controller, a depth of the working surface of the implement relative to the field to meet the target altitudes at respective points while the work vehicle moves along the field.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
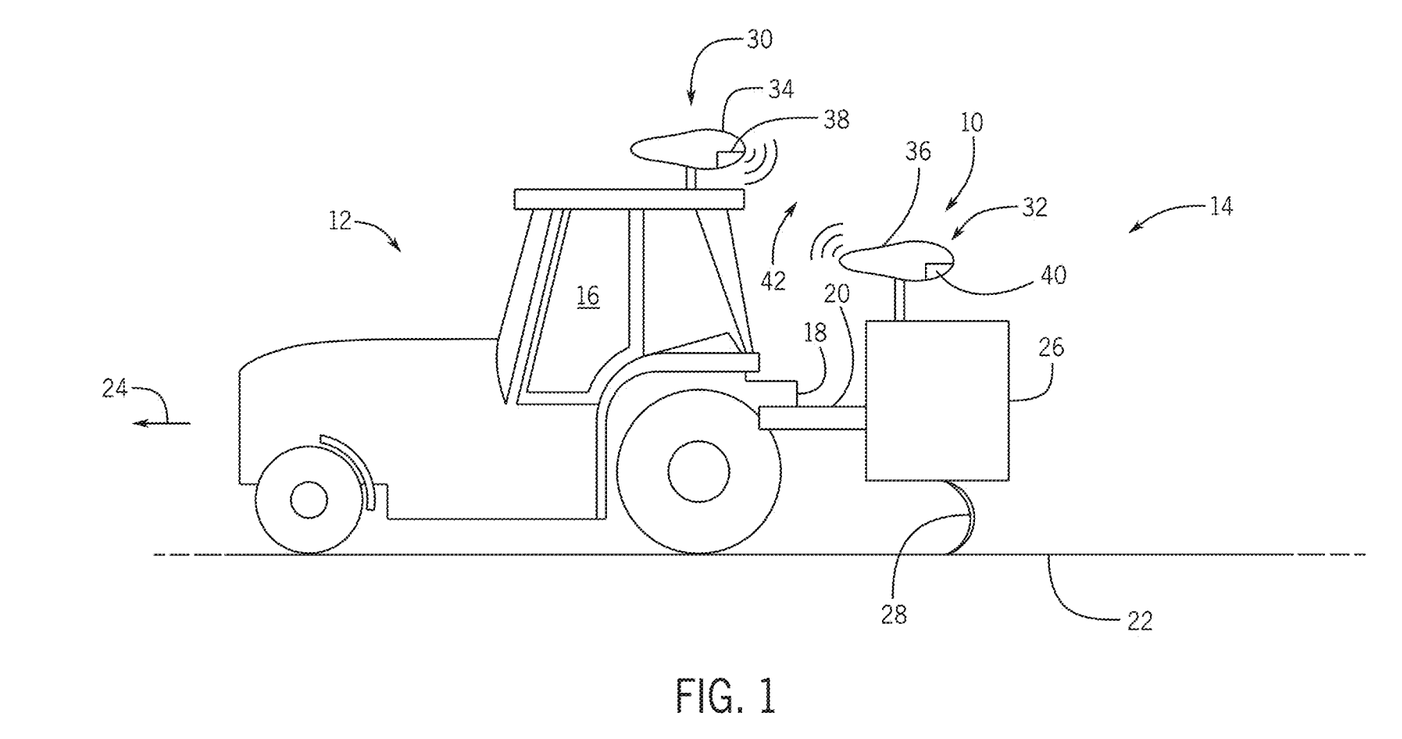
FIG. 1 is a perspective view of an embodiment of a work vehicle system including a work vehicle and an agricultural implement coupled to the work vehicle.

Turning now to the drawings, FIG. 1 is a perspective view of an embodiment of a work vehicle system 10 including a work vehicle 12 (e.g., autonomous work vehicles, semi-autonomous vehicles, work vehicles with autoguidance systems, etc.) and an agricultural implement 14 (e.g., box scraper, tile plow, etc.) coupled to the work vehicle 12. In some embodiments, the agricultural implement 14 may be towed behind the work vehicle 12 (e.g., as shown in FIG. 1). In other embodiments, the agricultural implement 14 may be incorporated into the work vehicle 12. The work vehicle 12 may be any vehicle suitable for towing the agricultural implement 14, such as a tractor, off-road vehicle, or the like. The work vehicle 12 may include a cab 16, in which an operator sits during operation of the work vehicle 12. The agricultural implement 14 may be coupled to the work vehicle 12 via a hitch 18. In one embodiment, the hitch 18 may be a three-point hitch that rigidly couples the implement 14 to the work vehicle 12, such that the agricultural implement 14 can move upward and downward, but cannot freely rotate with respect to the work vehicle 12. In another embodiment, the agricultural implement 14 may be coupled to the work vehicle 12 via a drawbar, enabling the agricultural implement to move 14 upward, downward, and rotate with respect to the work vehicle 12. In another embodiment, the implement 14 may be coupled to the work vehicle 12 via a steerable hitch, enabling the implement to move upward, downward, and be actuated to rotate or slide laterally with respect to the work vehicle 12. It should be understood, however that other systems for coupling the agricultural implement 14 to the work vehicle 12 may be used. In the illustrated embodiment, the agricultural implement 14 is attached to the work vehicle 12 via a tool bar 20 and the hitch 18. The agricultural system 10 travels over a field 22. The work vehicle 12 is configured to tow the agricultural implement 14 in a direction of travel 24. For reference, a forward direction should be understood to be in the direction of travel 24 and a rearward direction should be understood to be opposite the direction of travel 24. As depicted, the implement 14 includes a box scraper 26 having a working surface 28 (e.g., blade) to level soil or dig a ditch (e.g., for laying a pipe). With regard to land leveling, a filed may be made level or pitched to improve water flow. In certain embodiments, land leveling may include changing the pitch over different parts of the filed, while generally leveling the field. In another embodiment, the implement 14 may include a different type of implement 14 for leveling soil, tillage, clearing a ditch, or digging a ditch. For example, the implement 14 may include a plow (e.g., tile plow). In certain embodiments, clearing a ditch may include utilizing a curved swath along a ditch, where the slope of the ditch is controlled while the sediment or debris is cleared to improve the flow of water in the ditch.

In the illustrated embodiment, the work vehicle 12 and the agricultural implement 14 include spatial locating devices 30 and 32, respectively, which are each mounted to a respective one of the work vehicle 12 and the agricultural implement 14, and configured to determine a position of the work vehicle 12 or the agricultural implement 14, respectively. As will be appreciated, the spatial locating devices 30 and 32 may include any suitable system configured to determine the position of the work vehicle 12 and/or the position of the agricultural implement 14, respectively, such as Global Navigation Satellite System (GNSS) receivers 34, 36, for example. The receivers 34, 36 are configured to communicate with two or more satellites in orbit (e.g., GPS, GLONASS, Galileo, BeiDou, etc.) to determine the location, heading, speed, etc. of the work vehicle 12 and/or implement 14. Further, the spatial locating devices 30 and 32 may include inertial measurement units (IMU) 38 and 40, respectively, which may be used in dead-reckoning processes to validate motion of the GPS position against acceleration measurements. For example, the IMUs 34, 40 may be used for terrain compensation to correct or eliminate motion of the GPS position due to pitch and roll of the work vehicle 12 and/or agricultural implement 14. In certain embodiments, the spatial locating devices 30 and/or 32 may be configured to determine the position of the work vehicle 12 and/or the agricultural implement 14, respectively, relative to a fixed global coordinate system (e.g., via the GPS) or a fixed local coordinate system. Further, in some embodiments, the spatial location of the work vehicle 12 or the agricultural implement 14 may be inferred. For example, the agricultural implement location may be inferred based on the geometry of the agricultural implement 14, the geometry of the work vehicle 12, the location of the work vehicle 12, the hitch angle, or a combination thereof. The GNSS receivers 34, 36 have a high speed communication link 42 to enable the receivers 34, 36 to work together to generate a more accurate height (e.g., depth) and orientation of the working surface 28, to exchange information on satellite signals, to determine receiver orientations, correction signals, and other activities. As depicted, the communication link 42 is a wireless link. The wireless link 42 eliminates the need for a connector and wiring across the connection between the work vehicle 12 and the implement 14. In certain embodiments, the communication link 42 is a wired link. The spatial locating device 30 determines the location and attitude (roll, pitch, and yaw) of the work vehicle 12. The spatial locating device 32, in conjunction with the spatial locating device 30, determines the position and attitude of the working surface 28 of the implement 14. For example, the side to side tilt (roll), front to back tilt (pitch), and/or rotation (yaw) of the working surface 28 to the work vehicle 12 may be determined.

Figure 2:
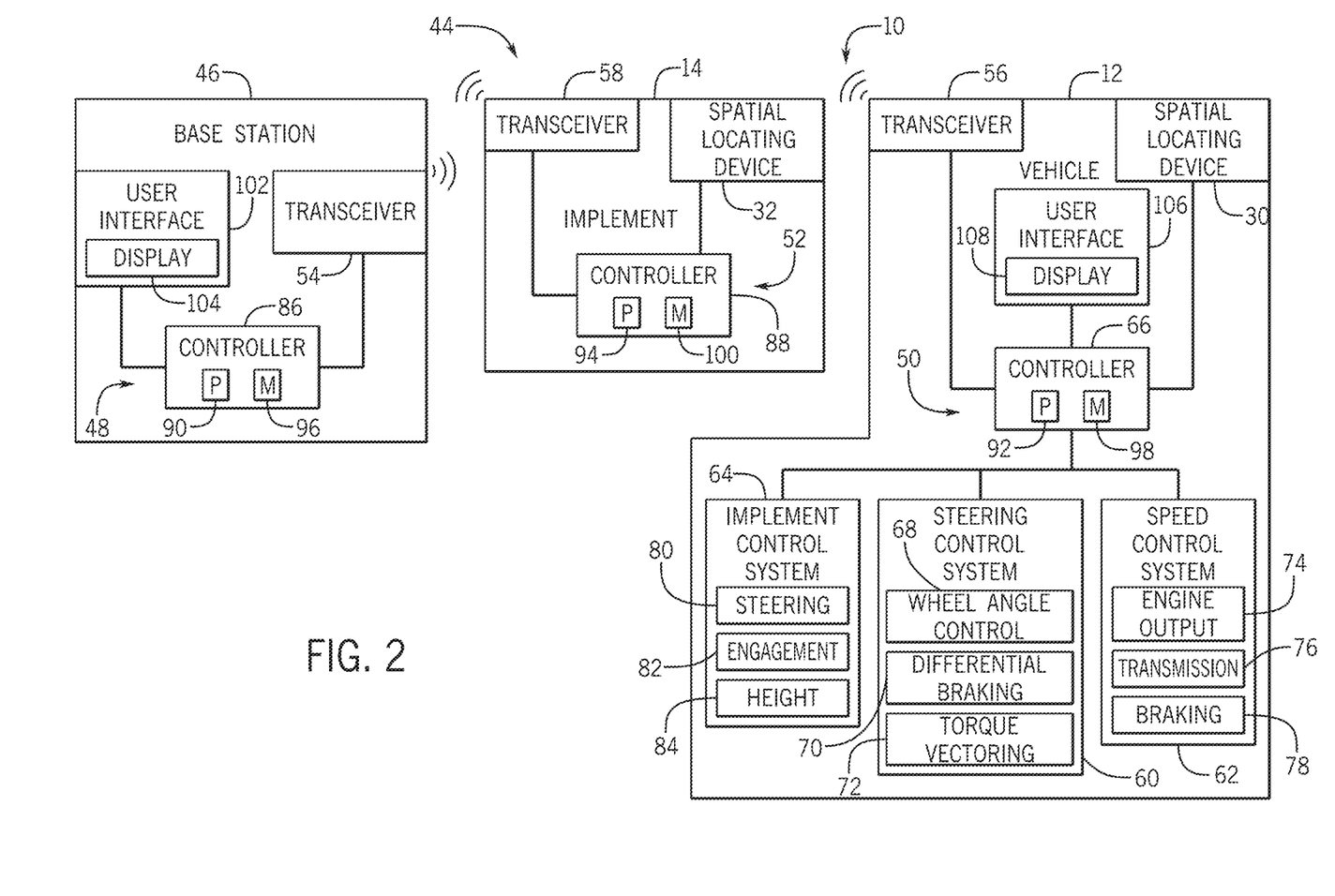
FIG. 2 is a block diagram of an embodiment of a global control system that may be utilized with the work vehicle system of FIG. 1.

FIG. 2 is a block diagram of an embodiment of a global control system 44 that may be utilized with the work vehicle system 10 of FIG. 1. Further, while the control system 44 is referred to as a "global" control system 44, "global" merely identifies the control system (e.g., to distinguish the global control system 44 from the other control systems disclosed herein). It should be appreciated that while the illustrated embodiments may be described with a base control system (e.g., the base station controller) of a base station 46 performing certain operations and the vehicle control system performing other operations, any suitable combination of the base control system and the vehicle control system may be used to perform various operations. For example, the operations may be performed on the vehicle 12 without a base station.

In the illustrated embodiment, the work vehicle 12 is configured to operate at least partially autonomously (e.g., without input from an operator present in the cab of the work vehicle 12). Accordingly, an automatic system (e.g., control system) may direct the work vehicle 12 and the agricultural implement 14 throughout the agricultural field 22 without direct control (e.g., steering control, speed control, etc.) by an operator. In the illustrated embodiment, the work vehicle 12 is configured to communicate with a controller of the base station 46 of the global control system 44. As discussed in detail below, the global control system 44 may include a controller of the work vehicle 12, the controller of the base station 46, a controller of the agricultural implement 14, or a combination thereof. In further embodiments, some aspects of the work vehicle 12 may be substantially manually controlled. For example, an operator may be located within the base station 22 and operate certain controls to control the work vehicle 12 and/or the agricultural implement 14. As such, the agricultural vehicle 12 may traverse the agricultural field 22 without an operator directly controlling operation of the work vehicle 12 from within the work vehicle 12 (e.g., autonomous operation). In certain embodiments, multiple work vehicles 12 with implements 14 may work the same field and communicate with each other and/or the base station 46. In certain embodiments, the base station 46 may be a real-time kinematic (RTK) base station utilized to provide a correction to the GNSS receivers 34, 36 that are mounted on the work vehicle 12 and the implement 14. The RTK base station may correct the GNSS receivers 34, 36 by intermittently transmitting a correction to the work vehicle 12 via a stationary GNSS receiver. In certain embodiments, the base station 46 may owned by a service provider and correction may be sent to the work vehicle via a variety of techniques (e.g., satellite cellular, or radio transmissions provided by the government (such as WAAS and EGNOS) or commercial provider) and protocols (e.g., NTRIP).

In the illustrated embodiment, the global control system 44 includes a base control system 48, a vehicle control system 50, and an implement control system 52, and each control system has a transceiver 54, 56, and 58, respectively, to establish wireless communication link(s). For example, transceiver 54 may communicate wirelessly with transceivers 56 and 58. Further, while each control system includes a single transceiver, multiple transceivers in any control system may be used to communicate at various frequency ranges within the electromagnetic spectrum. For example, the vehicle control system 50 and the implement control system 52 may communicate (e.g., wirelessly or wired) with one another. For instance, the vehicle control system 50 and the implement control system 52 may communicate with one another via a communication protocol (e.g., local interconnect network (LIN) communication, Wi-Fi communication, Ethernet communication, Controller Area Network (CAN) communication, international organization for standardization 11783 (ISO bus) communication, etc.). Further, the transceivers 56 and 58, or another transceiver of the vehicle and implement control system 50 and 52, respectively, may communicate using another standard protocol (e.g., cellular network) or a proprietary protocol.

In the illustrated embodiment, the work vehicle 12 and the agricultural implement 14 include spatial locating devices 30 and 32, respectively, as noted above. In certain embodiments, the transceivers 56 and/or 58 broadcast signal(s) indicative of the position(s) of the work vehicle 12 and/or the agricultural implement 14 to the transceiver 54 of the base station 46 (e.g., base station controller).

The work vehicle 12 includes a steering control system 60 configured to control a direction of movement of the work vehicle 12, a speed control system 62 configured to control a speed of the work vehicle 12, and an implement control system 64 to control the agricultural implement 14. A vehicle controller 66 may generate and send signal(s) to control one or more operations of the work vehicle 12 and/or the agricultural implement 14. For instance, the vehicle controller 66 may send signal(s) to the steering control system 60, the speed control system 62, and/or the implement control system 64. The steering control system 60 may include a wheel angle control system 68, a differential braking system 70, and a torque vectoring system 72. The wheel angle control system 68 may automatically rotate one or more wheels and/or tracks of the work vehicle 12 (e.g., via hydraulic actuators) to steer the work vehicle 12 along a desired route. By way of example, the wheel angle control system 68 may rotate front wheels/tracks, rear wheels/tracks, and/or intermediate wheels/tracks of the agricultural vehicle, either individually or in groups. The differential braking system 70 may independently vary the braking force on each lateral side of the work vehicle 12 to direct the work vehicle 12 along the desired route. Similarly, the torque vectoring system 72 may differentially apply torque from an engine to wheels and/or tracks on each lateral side of the work vehicle 12, thereby directing the work vehicle 12 along a desired route. While the illustrated steering control system 60 includes the wheel angle control system 68, the differential braking system 70, and the torque vectoring system 72, it should be appreciated that alternative embodiments may include one or two of these systems, in any suitable combination. Further embodiments may include an automated steering control system having other and/or additional systems to facilitate directing the agricultural vehicle along the desired route.

In the illustrated embodiment, the automated speed control system 62 includes an engine output control system 74, a transmission control system 76, and a braking control system 78. The engine output control system 74 is configured to vary the output of the engine to control the speed of the work vehicle 12. For example, the engine output control system 74 may vary a throttle setting of the engine, a fuel/air mixture of the engine, a timing of the engine, other suitable engine parameters to control engine output, or a combination thereof. In addition, the transmission control system 76 may adjust gear selection within a transmission to control the speed of the work vehicle 12. Furthermore, the braking control system 78 may adjust braking force, thereby controlling the speed of the work vehicle 12. While the illustrated automated speed control system 62 includes the engine output control system 74, the transmission control system 76, and the braking control system 78, it should be appreciated that alternative embodiments may include one or two of these systems, in any suitable combination. Further embodiments may include an automated speed control system having other and/or additional systems to facilitate adjusting the speed of the work vehicle.

In the illustrated embodiment, the implement control system 64 may turn the agricultural implement 14, raise or lower the agricultural implement 14, engage or disengage the agricultural implement 14, deploy ground-engaging tools of the agricultural implement 14, control the speed of the agricultural implement, etc., or a combination thereof. In the illustrated embodiment, the agricultural implement control system 64 includes an agricultural implement steering system 80, an agricultural implement engagement system 82, and an agricultural implement height (or depth) system 84. The agricultural implement steering system 80 may turn the agricultural implement 14 (e.g., by actuating one or more wheels and/or tracks) based on signals received from the vehicle control system 50. In some embodiments, steering may be accomplished by varying the speed of wheels or tracks on either side of the work implement. In some embodiments, the agricultural implement steering system 80 may be hydraulically actuated rather than, or in addition to, mechanically actuated (e.g., via gears). The agricultural implement engagement system 82 controls whether the agricultural implement 14 is in a lowered working position or a raised transport position. In some embodiments, for example, the agricultural implement 14 may be disengaged and/or retracted such that the work vehicle can traverse a soft boundary (e.g., mowed grass between a field and a road, a service road, etc.) or a portion of the field that is not being cultivated. The agricultural implement height system 84 may be used to control the height or depth of the engaged agricultural implement 14 relative to the ground (e.g., while the implement 14 is in the lowered working position). In some embodiments, the agricultural implement height system 84 may be hydraulically actuated to move the working surface 28 up and down with respect to the ground. For example, hydraulic valves on the vehicle 12 may be attached to a hydraulic cylinder on the implement 14 and utilized to adjust the target height or cutting depth of the working surface 28. Alternatively, in hitch mounted implements (e.g., via a three point hitch), hydraulic cylinders on the vehicle 12 may be utilized to adjust the target height or cutting depth of the working surface 28. While the illustrated agricultural implement control system 64 includes the agricultural implement steering system 80, the agricultural implement engagement system 82, and the agricultural implement height system 84, alternative embodiments may include any of these systems, in any suitable combination. Further embodiments may include an agricultural implement control system having other and/or additional systems to facilitate directing the implement along the path (e.g., an articulated steering system, etc.). The agricultural implement control system 64 may be controlled by the operator in a manual mode of operation. In an automatic or semi-automatic mode of operation, the agricultural implement control system 64 may be controlled automatically by the vehicle control system 50.

In the illustrated embodiment, the base control system 48, the vehicle control system 50, and the implement control system 52 each includes a controller, i.e., a base station controller 86, a vehicle controller 66, and an implement controller 88, respectively. Each controller 86, 66, and 88 include a processor 90, 92, and 94, respectively. The controllers 86, 66, and 88 may also include one or more storage devices and/or other suitable components, such as the memory devices 96, 98, and 100, respectively, operatively coupled to the processors 90, 92, and 94, respectively, to execute software, such as software for controlling the work vehicle 12 and the agricultural implement 14, and so forth. Moreover, the processors 90, 92, and 94 may each include multiple processors, one or more "general-purpose" microprocessors, one or more special-purpose microprocessors, and/or one or more application specific integrated circuits (ASICS), or some combination thereof. For example, each processor 90, 92, and 94 may include one or more reduced instruction set (RISC) processor, advanced RISC machine (ARM) processor, performance optimization with enhanced RISC (PowerPC) processor, field-programmable gate array (FPGA) integrated circuit, graphics processing unit (GPU), or any other suitable processing device.

Each memory device 96, 98, and 100 may include a volatile memory, such as random access memory (RAM), nonvolatile memory, such as read-only memory (ROM), flash memory, or any combination thereof. Each memory device 96, 98, and 100 may store a variety of information that may be used for various purposes. For example, each memory device 96, 98, and 100 may store processor-executable instructions (e.g., firmware or software) for the respective processors 90, 92, and 94 to execute, such as instructions for controlling the work vehicle 12 and/or the agricultural implement 14. The storage device(s) (e.g., nonvolatile storage) may include ROM, flash memory, a hard drive, or any other suitable optical, magnetic, or solid-state storage medium, or a combination thereof. The storage device(s) may store data (e.g., planned paths for the vehicle, planned paths for the implement, obstacle information, etc.), instructions (e.g., software or firmware for controlling the vehicle, etc.), and any other suitable data.

In the illustrated embodiment, the base control system 48 includes a user interface 102 having a display 104. The vehicle control system 50 includes a user interface 106 having a display 108. The controllers 86 and 66 may receive input(s) (e.g., via the respective displays 104 and 108, such as a touchscreen display, a mouse, a keyboard, etc.) related to planning paths for the work vehicle 12, the agricultural implement 14, or both. While these are examples, various inputs and/or outputs may be received/sent to enable an operator to control aspects related to the vehicle and/or implement. In certain embodiments, the display 104 and/or 108 may present to the operator a graphical representation of a swath. In certain embodiments, the display 104 and/or 108 may present to an operator (as described in greater detail below) a coverage map for a field. The coverage map may indicate the swaths, indicate which portions of which swaths have been worked and/or not worked. In addition, the coverage map may indicate the number of cuts or runs on a swath and whether or not a desired altitude (or slope) was reached. In certain embodiments, the coverage map may also display swath lines, automatic end of row turns, boundaries, obstacles, and other features.

The base control system may be located at the base station 46. Alternatively, the base control system may be located in the agricultural vehicle, another agricultural vehicle, or any other suitable location. For example, the agricultural vehicle controller may be used to perform one or more of the path planning steps and/or control steps. In certain embodiments, the controller 66 and/or 86 is configured to receive signal(s) indicative of one or more characteristics of the agricultural fields via the transceiver 56 and/or 54. In certain embodiments, the controller 66 and/or 86 may receive signals (e.g., via the transceivers 56 and 54) from the work vehicle 12 indicative of a location, a size, and/or a shape of slopes, rocks, bodies of water, field boundaries, or other characteristics related to the layout and/or obstructions within the field. Alternatively and/or additionally, the controller 66 and/or 86 may obtain the one or more characteristics of the agricultural fields from the memory 98 and/or 96 (e.g., stored from other processes, from agricultural operations, from the inputs to the user interface 106 or 102, etc.). In certain embodiments, a target terrain map including swaths with respective points including target altitude data may be stored in the memory 98 and/or 96 or provided to the controller 66 and/or 86. In other embodiments, the controller 66 and/or 86 may obtain the one or more characteristics of the field via the spatial locating devices 30 and 32.

In certain embodiments, the controller 66 and/or 86 is configured to receive one or more characteristics (e.g., position and orientation data) from the spatial locating devices 30 and 32. From these characteristics, the controller 66 and/or 86 is configured to determine a location and attitude (e.g., raw, pitch, yaw) of the work vehicle 12 relative to the field 28. In addition, the controller 66 and/or 86 is configured to determine a position and attitude of the implement 14. Further, the controller 66 and/or 86 can determine the side to side tilt (roll), front to back tilt (pitch), and/or rotation (yaw) of the working surface 28 to the work vehicle 12. Based on the attitude of the implement 14 to the working vehicle, the controller 66 and/or 86 may then determine the attitude of the working surface 28 to the ground.

Figure 3:
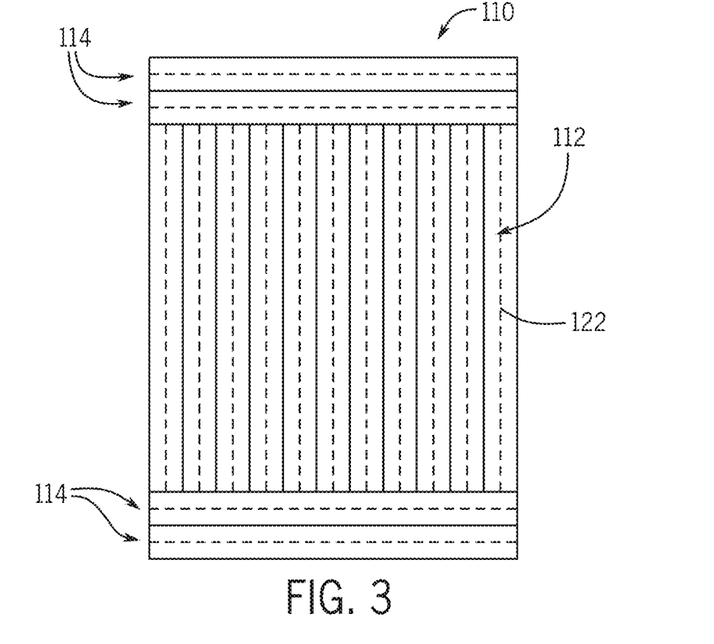
FIG. 3 is a schematic diagram of an embodiment of a field that includes straight swaths and headland swaths.
Figure 4:
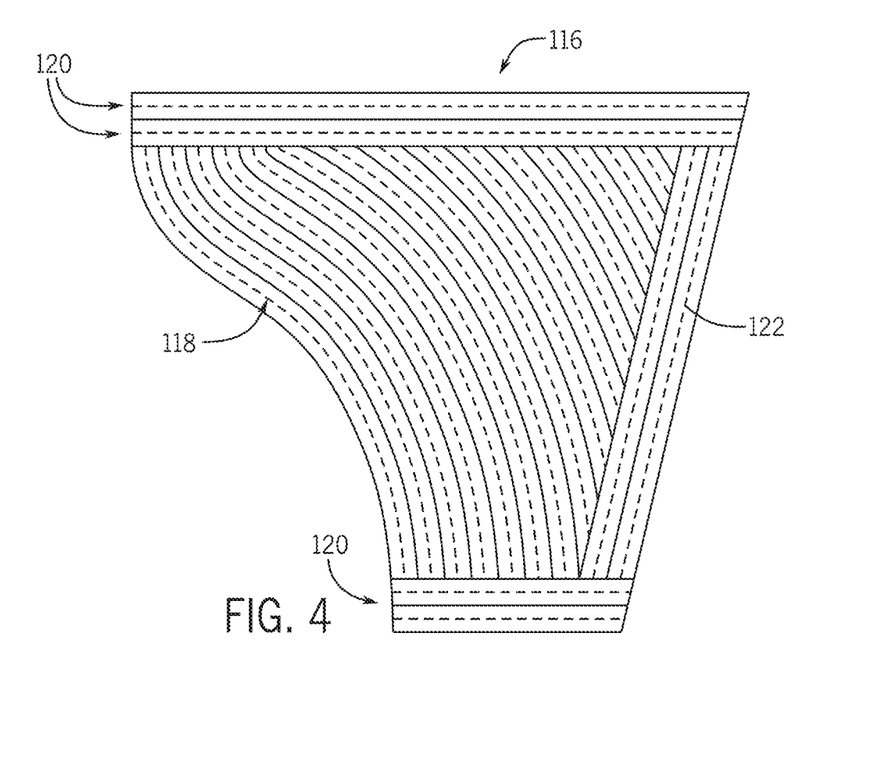
FIG. 4 is a schematic diagram of an embodiment of a field that includes curved swaths and headland swaths.

Based on the field information, the controller 66 and/or 86 may generate multiple evenly spaced swaths for one or more work vehicles 12 to work. The swaths may include straight or curved swaths. Headlands may also be included. The swaths are evenly spaced utilizing a swath width (e.g., the same as the implement width) and altitude or slope considerations. In certain embodiments, a recorded swath may be imported (e.g., from another computer device) for generating the swaths. For example, as illustrated in FIG. 3, a rectangular field 110 that needs land leveling may include multiple interior swaths 112 and headland swaths 114. As depicted, the interior swaths 112 are straight and parallel. The headland swaths 114 flank the interior swaths 112 and extend in a direction perpendicular to the interior swaths 122. Alternatively, as illustrated in FIG. 4, a field 116 needing leveling that has an irregular shape. The field 116 includes interior swaths 118, where some of the swaths 118 are curved and/or parallel. As depicted, the swaths 118 may be flanked by headland swaths 120 extending in a direction crosswise to the interior swaths 118. Each swath in FIGS. 3 and 4 includes a center line 122 (e.g., swath line) that includes a series of points spaced apart (e.g., 3 to 10 meters apart).

The controller 66 and/or 86 may generate targets altitudes or slopes for different swaths of the field. For example, target altitudes or slope may be assigned to the swath lines (e.g., points along the swath lines). In certain embodiments, a single swath may include a same slope or different slopes. In certain embodiments, one or more swaths in a field may include different slopes.

In certain embodiments, the controller 66 and/or 86 may assign the altitudes to a respective swath line of a swath via one or more planes. For example, a plane may be constructed over any portion of the field. The plane may have a specific slope. Based on the slope of the plane, target altitudes may be assigned to respective points along a swath line. In certain embodiments, different planes with different slopes may be constructed over different parts of a field defined by polygons.

In certain embodiments, the controller 66 and/or 86 may assign the altitudes to a respective swath line based on obtained general map data (e.g., terrain map). The map data includes target or desired altitudes at different points on the ground. Interpolation, based on the map data, may be utilized to determine the target altitude at respective swath points.

In certain embodiments, the controller 66 and/or 86 may assign the altitudes based on interpolation (e.g., of points along a recorded swath). For example, a single starting point along a given swath may have a measured altitude and the rest of the swath points may be assigned a target altitude based on a constant slope. Alternatively, interpolation may be performed between two different points with measured attitudes along a swath line to generate a slope and thus target altitudes for intervening swath points based on the slope.

Figure 5:
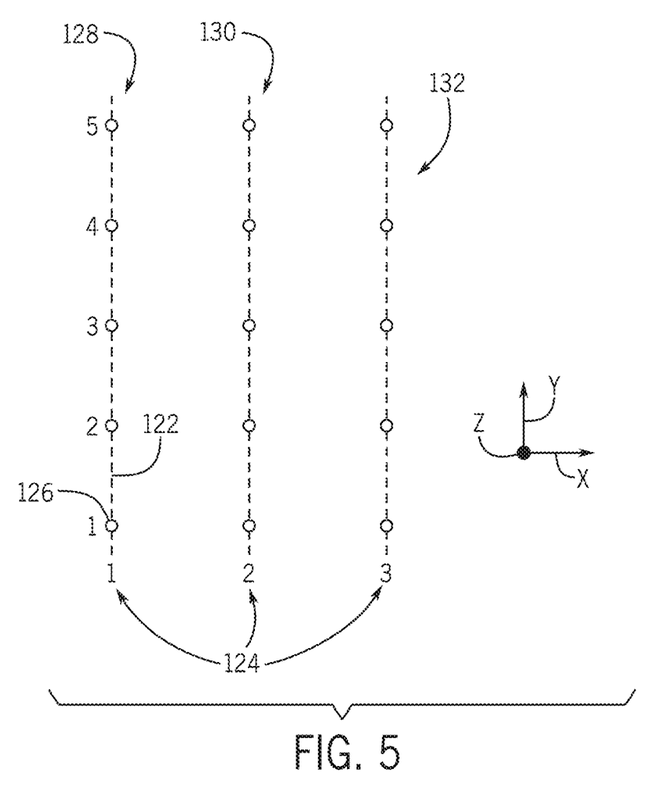
FIG. 5 is a schematic diagram of an embodiment of swath lines generated from adjacent swaths.

In certain embodiments, the controller 66 and/or 86 may assign the altitudes based on altitudes of an adjacent swath. For example, FIG. 5 illustrates swaths 124 having an altitude determined from adjacent swaths 124. Each swath 124 includes the center line 122 (e.g., swath line) that includes a series of points 126 spaced apart (e.g., 3 to 10 meters apart). Each point 126 of a first swath 128 includes an x-, y-, and z-coordinate (with the z-coordinate being the altitude). The coordinates for each point 126 for a second swath 130 are calculated (translated over) from the coordinates of the points of the first swath 128. Similarly, the coordinates for each point 126 for a third swath 132 are calculated from the coordinates of the points of the second swath 130. As noted above, the swaths 124 are evenly spaced apart (e.g., by the implement width). The altitude (e.g., z-coordinate) for the adjacent swath may be adjusted based on a designated change of slope. For example, the altitude for the points 126 of the second swath 130 may be adjusted from the corresponding points 126 of the first swath 128 by the designated change of slope. Similarly the altitude for the points 126 of the third swath 132 may be adjusted from the corresponding points 126 of the second swath 130 by the designated change of slope. The adjacent swaths 124 may be straight or curved swaths. Techniques for determining a curved swath disclosed in U.S. Pat. No. 7,689,356, entitled "METHOD AND APPARATUS FOR CREATING CURVED SWATH PATTERNS FOR FARM MACHINERY, issued Mar. 30, 2010 (and incorporated by reference in its entirety), may be modified to include altitude data.

Figure 6:
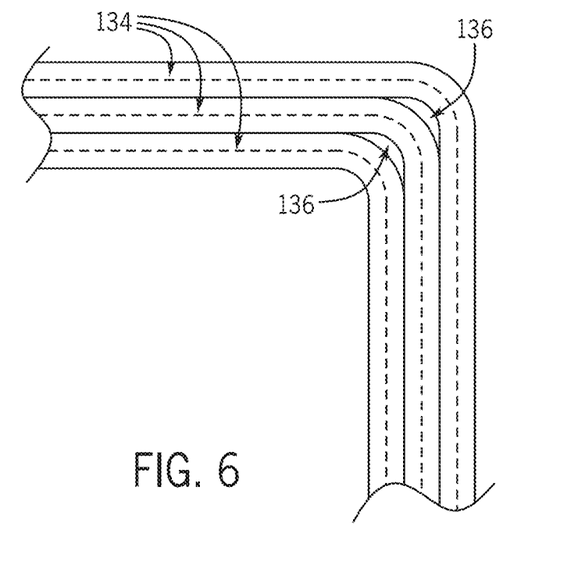
FIG. 6 is a schematic diagram of an embodiment of swaths that include curved swaths generated with a radius of curvature limit.
Figure 7:
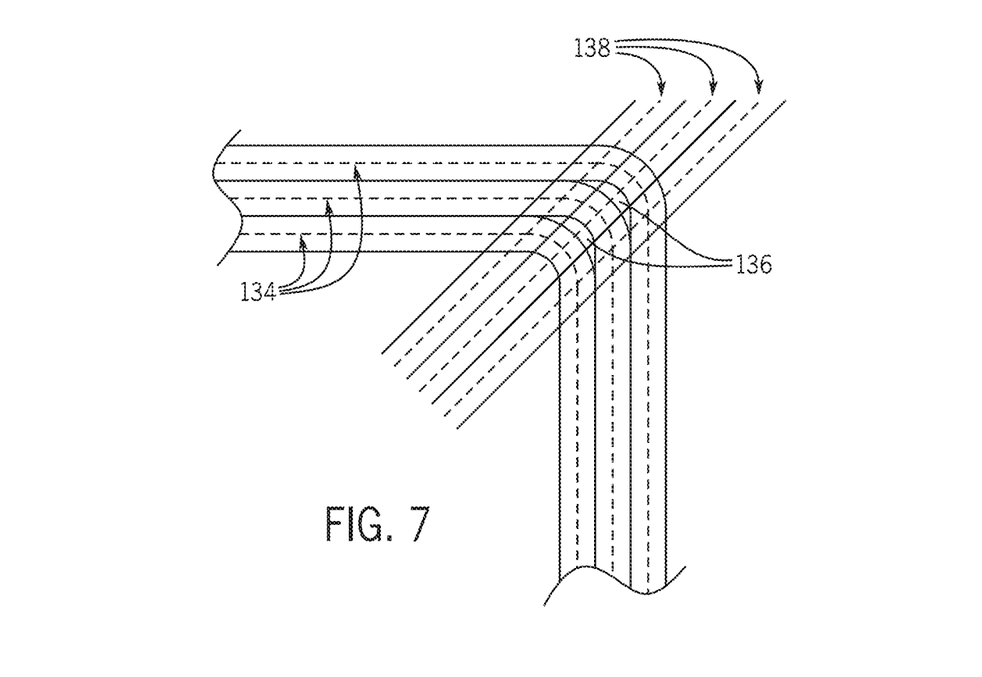
FIG. 7 is a schematic diagram of an embodiment of the swaths in FIG. 6 with perpendicular swaths to work gaps between the curved swaths.

In certain embodiments, the controller 66 and/or 86 is configured to determine the path of the vehicle 12 and the height of the working surface 28 (e.g., relative to the ground) by interpolation between swath points. The controller 66 and/or 86 interpolation between swath points limits the rate of change in both the steering and altitude control (i.e., height of the working surface 28) based on rates achievable by the control system (e.g., control system 50). This enables the controller 66 and/or 86 to plan both a smooth path and a smooth surface. As illustrated in FIG. 6, the radius of curvature of swaths may be limited. As depicted in FIG. 6, adjacent swaths 134 are evenly spaced with no overlap in the absence of a tight turn. However, in tighter turns where the radius of curvature is limited, gaps 136 are left between the adjacent swaths 134. As depicted in FIG. 7, perpendicular passes 138 over the areas with the tight turns takes care of the gaps 136 between the adjacent swaths 134. Besides radius of curvature limits, gaps 136 may occur between adjacent swaths 134 due to other reasons (e.g., obstacles). Generating curved swaths and translating the slope in a direction perpendicular to the curve enables the creation and maintenance of terraces to avoid runoff and erosion.

Based on the generated swaths with altitude data, the controller 66 and/or 86 is able to control both the steering of the vehicle 12 and the height of the working surface 28 as the vehicle 12 and the implement 14 move along the planned swaths. Since steering of the vehicle 12 and the height of the working surface 28 are simultaneously controlled, no gaps or excessive overlap between adjacent swaths occurs, thus, saving time and fuel. The controller 66 and/or 86 takes into account the location and attitude of vehicle 12 and the position and attitude of the implement based on the received data from the spatial locating devices 30, 32. In certain embodiments, the controller 66 and/or 86 may utilize an altitude nudge feature (e.g., altitude correction feature) for adjusting the height of the working surface 28 to correct for an error in the estimate of the height of the working surface 28. The working surface 28 of the implement 14 may referenced to a known point in the field with a known altitude where the working surface 28 contacts the field. The estimated height of the working surface 28 based on the data from the spatial locating devices 30, 32 is compared to the actual height of working surface 28 relative to the known point of the field to determine an amount of error correction (e.g., nudge distance). The nudge distance may then be recorded and displayed by the control system. The controller 66 and/or 86 may adjust the estimated height utilized based on the data from the spatial locating devices by the nudge distance during operation of the vehicle along the planned swaths to achieve the targeted depth or slope.

Figure 8:
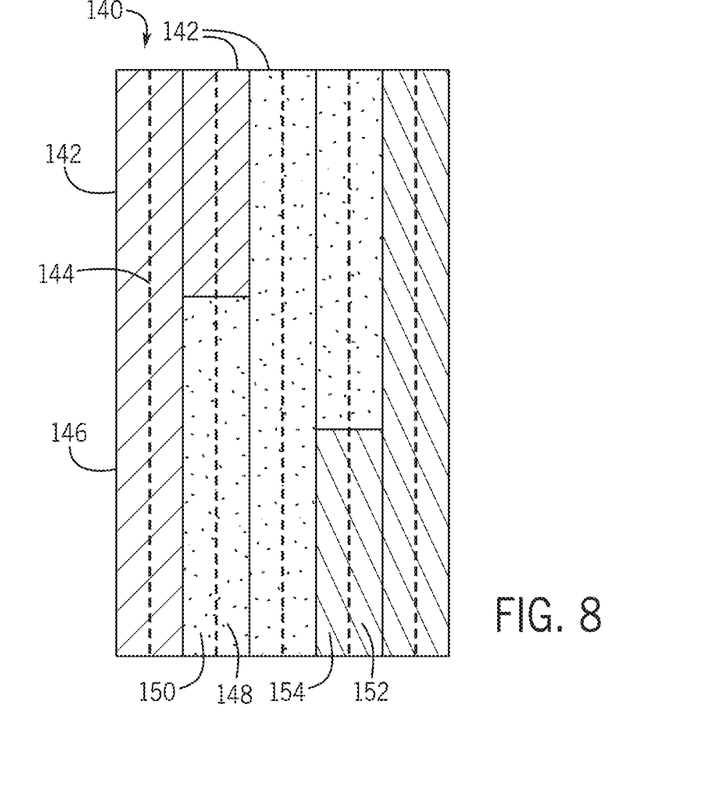
FIG. 8 is a schematic diagram of an embodiment of coverage map.

In certain embodiments, the controller 66 and/or 86 is configured to generate or obtain a coverage map for the area of field to be worked on (e.g., for land leveling, for pipe laying, for ditch clearing, etc.). FIG. 8 depicts an example of a coverage map 140. As illustrated, the coverage map 140 includes swaths 142 with swath lines 144. The swaths 142 (or portions of the swaths 142) may be shaded, colored, or otherwise marked to indicate whether or not a desired altitude or slope has been reached. For example, swath 146 includes a single hatch to indicate the swath 146 is above grade, swath 148 includes dots to indicate a portion 150 of the swath 148 is at grade, and swath 152 includes double hatching to indicate a portion 154 of the swath 52 is above grade. In certain embodiments, text (e.g., yes, no, above grade, at grade, below grade, etc.) may indicate the altitude or slope status of the swath 142. In certain embodiments, different colors may indicate different statuses of the altitude or slope of the swath 142. In certain embodiments, the coverage map include coloring, shading, or text to indicate a number of times the swath 142 has been worked (e.g., cut). In certain embodiments, automatic end of row turns, boundaries, obstacles, and/or other features may displayed on the coverage map 140. In certain embodiments, the coverage map 140 or maps may be shared wirelessly between autoguidance systems of multiple vehicles (e.g., directly or via the base station 46) to enable the vehicles to work the same field efficiently.

Figure 9:
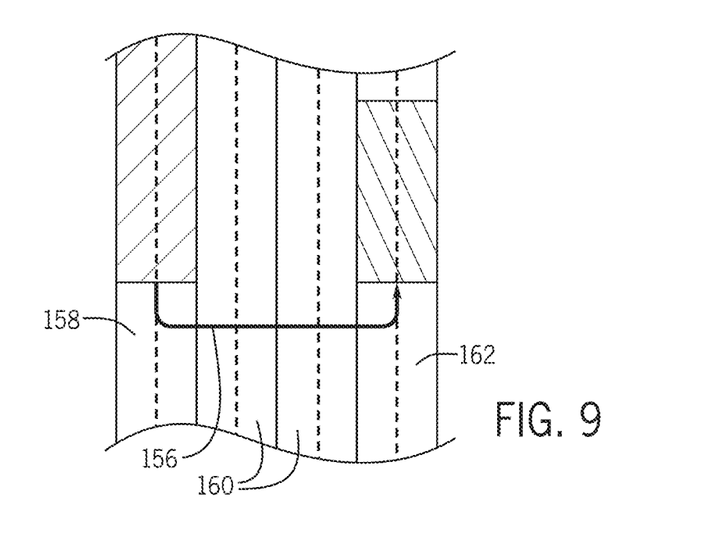
FIG. 9 is a schematic diagram of an embodiment of a path that skips swaths.

In certain embodiments, at the end of each swath or prior to the end of the swath, a path can be planned to turn around or engage the next swath. FIG. 9 depicts a path 156 where that proceeds from swath 158, skips swaths 160, and proceeds to swath 162. In particular, based on the grades of the swaths (e.g., as indicated in the coverage map 140 in FIG. 8), a determination can be made automatically or by an operator to determine which swath to engage next. For example, a vehicle working the above grade swath 158 may skip to swath 162 (i.e., a below grade swath) to unload soil.

Figure 10:
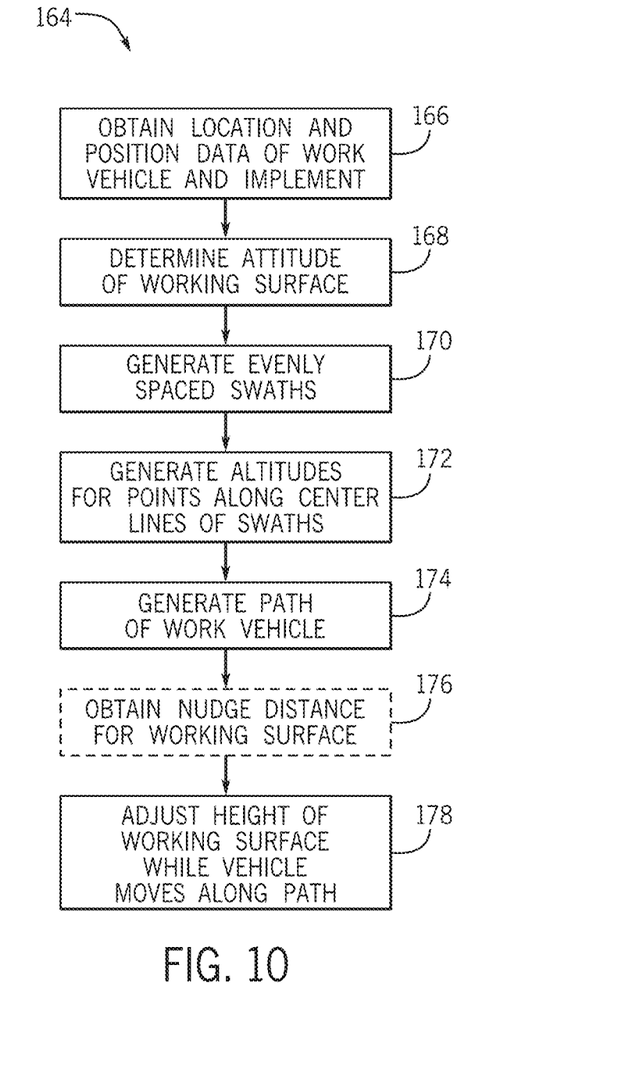
FIG. 10 is a flow diagram of an embodiment of a method for controlling (e.g., a height or depth of) an implement of a work vehicle system.

FIG. 10 is a flow diagram of an embodiment of a method 164 for controlling (e.g., a height or depth of) the implement 14 of the work vehicle system 10. The method 164 includes obtaining location and positioning data of the work vehicle 12 and the implement 14 (e.g., from the spatial locating devices 30, 32) (block 166). The method 164 also includes determining an attitude of the working surface 28 of the implement 14 relative to the field or ground (block 168). The position and orientation of both the vehicle 12 and implement 14 can be determined based on the data received form the spatial locating devices 30, 32. Based on the position and orientation (e.g., attitude) of the work vehicle 12 and the position of the implement 14, the orientation (e.g., attitude) of the working surface 28 to the vehicle 12 and the ground may be determined.

The method 164 further includes generating evenly spaced swaths, each having a center line, for the work vehicle system 10 to work (block 170). The method 164 even further includes generating or assigning the altitudes (e.g., target altitudes) for points along the center line of each respective evenly spaced swath (block 172). The assigning of altitudes may be generated via numerous techniques as described above. For example, planes with specific slopes may be constructed over portions (e.g., swaths) of the field to assign the target altitudes. In certain embodiments, altitudes of the points may also be assigned based on obtained general map date (e.g., terrain map). In certain embodiments, altitudes of the points may be assigned via interpolation from a single starting point or between two points based on a desired slope. In certain embodiments, altitudes of the points may be assigned based on altitudes of an adjacent swath (e.g., via interpolation based on a change in slope).

In certain embodiments, the method 164 even further includes obtaining a nudge distance to correct for an amount of error between the estimated height of the working surface 28 (e.g., based on the data from the spatial locating devices 30, 32) and the actual height of working surface 28 relative to the known point of the field. (block 176). The nudge distance may be obtained as discussed above. The method 164 also includes adjusting a height or depth of the working surface 28 to meet the target altitude or slope at points along the swath as the vehicle moves along the path or field (block 178).

In certain embodiments, the method 164 disclosed above is performed by the work vehicle controller and/or a base station controller. In addition, the steps of the method 164 may be performed in the order disclosed above, or the steps may be performed in a different order. Furthermore, in certain embodiments, certain steps of the method 164 may be omitted.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control system for a work vehicle of a work vehicle system, comprising:
   at least one controller comprising a memory and a processor, wherein the at least one controller is configured to:
   determine an attitude of a working surface of an implement relative to a field, wherein the attitude comprises a roll, a pitch, and a yaw of the working surface of the implement relative to the field;
   generate evenly spaced swaths of the field, each swath having a center line;
   determine target altitudes for points along the center line for a respective swath; and
   adjust, based on the determined attitude, a depth of the working surface of the implement relative to the field to meet the target altitudes at respective points while the work vehicle moves along the field.

2. The control system of claim 1, wherein the at least one controller is configured to determine the attitude of the working surface based on global positioning system (GPS) data of the work vehicle received from a first receiver disposed on the work vehicle and GPS data of the implement received from a second receiver disposed on the implement.

3. The control system of claim 1, wherein the evenly spaced swaths comprise straight swaths, curved swaths, or a combination thereof.

4. The control system of claim 1, wherein the at least one controller is configured to determine the target altitude for the points based on a respective plane disposed over the respective swath, the plane having a specific slope.

5. The control system of claim 4, wherein respective planes of different swaths comprise the same slopes.

6. The control system of claim 4, wherein respective planes of different swaths comprise different slopes.

7. The control system of claim 1, wherein the at least one controller is configured to determine the target altitude for the points based on a target terrain map having target altitudes at different points of the map.

8. The control system of claim 1, wherein the at least one controller is configured to determine the target altitude for the points based on a target slope.

9. The control system of claim 1, wherein the at least one controller is configured to limit a rate of change in the target altitudes between adjacent points along the center line based on handling limitations of the work vehicle and the implement.

10. The control system of claim 1, wherein the at least one controller is configured to correct the depth based on a measured error between an estimated distance between the working surface of the implement and a known point along the field and an actual estimated distance between the working surface of the implement and the known point.

11. The control system of claim 1, wherein the at least one controller is configured to generate evenly spaced swaths of the field by interpolating target altitudes for points along a second center line of a second swath from points along a first center line of a first swath, wherein the first and second swaths are parallel and adjacent swaths.

12. The control system of claim 1, wherein the at least one controller is configured to provide an indication of at least one of which swaths have been worked, how many times a particular swath has been worked, and whether the target altitudes for the swath have been met.

13. At least one tangible, non-transitory, machine readable media comprising instructions configured to cause a processor to:
   determine an attitude of a working surface of an implement relative to a field, wherein the attitude comprises a roll, a pitch, and a yaw of the working surface of the implement relative to the field;
   generate evenly spaced swaths of the field, each swath having a center line;
   determine target altitudes for points along the center line for a respective swath; and
   adjust, based on the determined attitude, a depth of the working surface of the implement relative to the field to meet the target altitudes at respective points while the work vehicle moves along the field.

14. The at least one tangible, non-transitory, machine-readable media of claim 13, wherein the instructions are configured to determine the target altitude for the points based on one or more planes disposed over the respective swath, each plane of the one or more planes having a specific slope.

15. The at least one tangible, non-transitory, machine-readable media of claim 13, wherein the instructions are configured to determine the target altitude for the points based on a target terrain map having target altitudes at different points of the map.

16. The at least one tangible, non-transitory, machine-readable media of claim 13, wherein the instructions are configured to limit a rate of change in the target altitudes between adjacent points along the center line based on handling limitations of the work vehicle and the implement.

17. The at least one tangible, non-transitory, machine-readable media of claim 13, wherein the instructions are configured to generate evenly spaced swaths of the field by interpolating target altitudes for points along a second center line of a second swath from points along a first center line of a first swath, wherein the first and second swaths are parallel and adjacent swaths.

18. A method for controlling an implement for a work vehicle of a work vehicle system, comprising:
   determining, via at least one controller, an attitude of a working surface of the implement relative to a field, wherein the attitude comprises a roll, a pitch, and a yaw of the working surface of the implement relative to the field;
   generating, via the at least one controller, evenly spaced swaths of the field, each swath having a center line;
   determining, via the at least one controller, target altitudes for points along the center line for a respective swath; and
   adjusting, via the at least one controller and based on the determined attitudea depth of the working surface of the implement relative to the field to meet the target altitudes at respective points while the work vehicle moves along the field.

19. The method of claim 18, comprising limiting, via the at least one controller, a rate of change in the target altitudes between adjacent points along the center line based on handling limitations of the work vehicle and the implement.

20. The method of claim 18, wherein generating evenly spaced swaths of the field comprises interpolating target altitudes for points along a second center line of a second swath from points along a first center line of a first swath, wherein the first and second swaths are parallel and adjacent swaths.

* * * * *